United States Patent [19]
Allison

[11] 3,811,337
[45] May 21, 1974

[54] ENERGY ABSORBING STEERING COLUMN FOR MOTOR VEHICLES

[75] Inventor: William D. Allison, Grosse Pointe Farms, Mich.

[73] Assignee: Ford Motor Company, Dearborn, Mich.

[22] Filed: Apr. 4, 1973

[21] Appl. No.: 347,963

[52] U.S. Cl. .................................................. 74/492
[51] Int. Cl. ............................................. B62d 1/18
[58] Field of Search ............. 74/492, 493; 280/87 A

[56] References Cited
UNITED STATES PATENTS
| | | | |
|---|---|---|---|
| 2,852,958 | 9/1958 | May | 74/493 |
| 2,899,214 | 8/1959 | D'Antini | 74/492 X |

Primary Examiner—Samuel Scott
Assistant Examiner—F. D. Shoemaker
Attorney, Agent, or Firm—Clifford L. Sadler; Keith L. Zerschling

[57] ABSTRACT

This disclosure relates to an energy absorbing steering column for a motor vehicle, and more particularly to a column that is constructed to collapse in a controlled manner under an impact load against the steering wheel and thereby absorb the kinetic energy of the impact. According to a preferred embodiment, the steering column includes a piston device that is constructed to displace the steering column and steering wheel rearwardly when subjected to a compressed gas. A compressed gas source is connected through an inertia sensitive valve to the steering column whereby the compressed gas is conveyed to the column in response to extreme vehicle deceleration such as might occur in a collision. Thus, when the vehicle strikes an object, the compressed gas released to the steering column will extend the column rearwardly and increase the distance through which the column may collapse to absorb the kinetic energy of an object striking the steering wheel.

7 Claims, 4 Drawing Figures

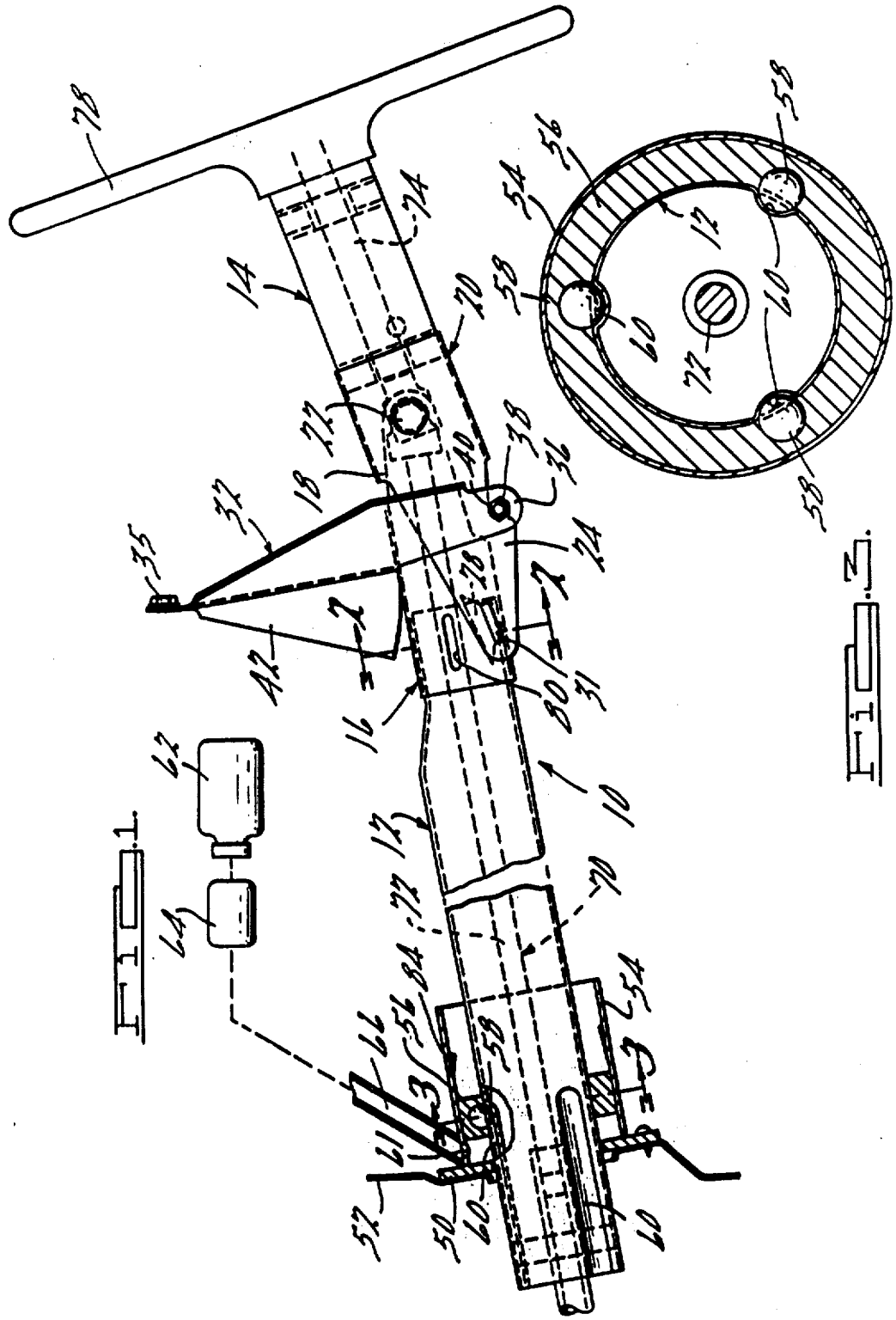

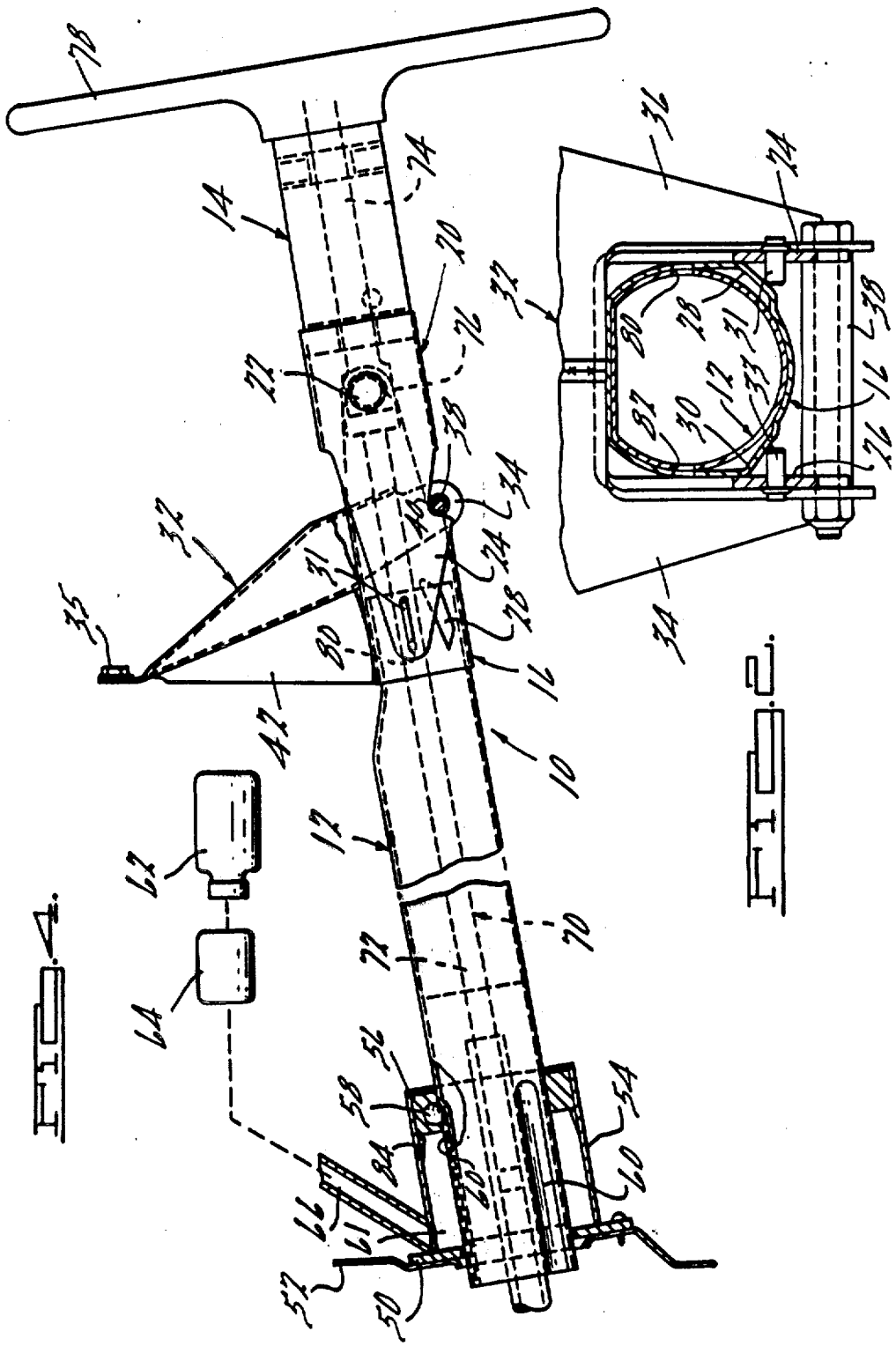

ENERGY ABSORBING STEERING COLUMN FOR MOTOR VEHICLES

BACKGROUND OF THE DISCLOSURE

The present invention relates to collapsible energy absorbing steering columns for motor vehicles. More particularly, the invention concerns a steering column having means for extending the column rearwardly in the event the vehicle strikes an object whereby the collapsible distance of the column is greatly increased. By increasing the distance which the steering wheel may move while the column is collapsing under an impact load, the energy absorbing capacity of the column is increased.

BRIEF SUMMARY OF THE DISCLOSURE

In the preferred embodiment of this invention, a steering column has a rearward outer tube and a forward outer tube that are connected by a pivot. A steering shaft assembly is rotatably supported in the outer tubes of the column. The shaft assembly includes a rearward shaft portion universally joined to a forward shaft portion at a point on the axis of the pivot between the outer tubes. The forward shaft portion includes two shaft sections that are telescopically interconnected.

The connection between the column outer tubes and the steering shaft portions permits the steering wheel to be arranged at a fixed angle that is convenient to the vehicle operator.

A bendable support bracket connects the column assembly to the instrument panel at a point near the pivot between the column outer tubes.

The forward end of the forward column outer tube is situated within a stationary cylindrical member that is mounted on the vehicle fire wall. The cylindrical member, in combination with the forward end of the forward outer column tube, defines a portion of an annular expansible chamber. A ring that functions as an annular piston is in slidable sealed engagement with the outer tube and the cylindrical member.

The ring supports a series of balls that are constructed to plastically deform surface grooves in the forward outer tube during column collapse under an impact load.

The annular expansible chamber is connected through an inertia sensitive valve with a compressed gas source. In the event the vehicle strikes an object, the inertia sensor will detect the deceleration and will cause compressed gas to flow to the expansible chamber where the pressure of the gas upon the ring will cause the steering column to be displaced rearwardly.

When the column assembly is displaced rearwardly, the support bracket between the column tubes will force the rearward tube from its normally angled position to a position coaxial with the forward tube.

After the column has been expanded, the ring will be locked in a rearward position by a series of detents. When an impact is imposed upon the steering wheel with the column in an extended position, the forward column tube will be displaced forwardly with the balls carried by the ring plowing grooves in the surface of the tube. This plastic deformation of the forward outer column tube will absorb the kinetic energy of the impact against the steering wheel. Because the column has been extended rearwardly, the distance which it may traverse while being plastically deformed by the balls will have been greatly increased and as a consequence, the load absorbing capacity of the column will have been correspondingly increased.

BRIEF DESCRIPTION OF THE DRAWINGS

The many objects and advantages of the present invention will become apparent upon consideration of the following detailed description and the accompanying drawings, in which:

FIG. 1 is a side elevational view of a collapsible energy absorbing steering column constructed in accordance with this invention;

FIG. 2 is a sectional view taken along section line 2—2 of FIG. 1;

FIG. 3 is a sectional view taken along section line 3—3 of FIG. 1; and

FIG. 4 is a side elevational view of the steering column of FIG. 1 showing the column in its extending position.

DETAILED DESCRIPTION OF THE PREFERRED EMBODIMENT

Referring now to the drawings, wherein the presently preferred embodiment of this invention is shown, FIG. 1 illustrates a collapsible energy absorbing steering column assembly 10. The steering column assembly 10 includes a forward tube 12 and a rearward tube 14. The forwardly extending arms 24, 26 have inwardly directed detent members 31 and 33 which engage the ramp surfaces 28 and 30.

The forward tube 12 has an annular member 16 rigidly secured thereto. The member 16 has a bifurcated rearward end 18 that is fitted within an annular member 20 rigidly secured to the rearward tube 14. A pair of pivots 22 pivotally connect the bifurcations 18 of the member 16 to the annular member 20 of the rearward tube 14.

The annular member 20 has a pair of forwardly extending arms 24 and 26 that are disposed in side-by-side relationship to ramp portions 28 and 30 formed on the annular member 16. The forwardly extending arms 24, 26 have inwardly directed detent members 31 and 33 which engage the ramp surfaces 28 and 30.

The column tubes 12 and 14, together with the interengaging members 16 and 20, are supported in the angled relationship illustrated in FIG. 1 by a support bracket 32 which has depending leg portions 34 and 36. The leg portions 34 and 36 straddle the forwardly extending arms 24, 26 of the member 20. A bolt 38 interconnects the lower ends of the leg portions 34 and 36 of the bracket 32 and is fitted in notches 40 formed in the arms 24 and 26.

The bracket 32 is secured at its upper end to the vehicle's instrument panel by a bolt 35.

The bracket 32 has a forwardly extending vertical flange 42 with a lower cam edge of arcuate configuration that bears against the annular member 16 secured to the column tube 12.

The engagement of the bracket supported bolt 38 with notches 40 in the member 20, the flange 42 with the annular member 16 and the detent members 31, 33 of the member 20 with the ramp surfaces 28 and 30 of the annular member 16 combine to support the column 10 and hold the outer tubes 12 and 14 in the angled position of FIG. 1.

The forward end of the forward tube 12 extends through an annular reinforcing member 50 secured to the fire wall 52. A cylindrical member 54 is secured to the reinforcing member 50. A ring 56 forms an annular piston and has its outer periphery in sealed slidable engagement with the inner surface of the cylindrical member 54. The ring 56 carries three spaced apart balls 58 which are fitted in grooves 60 formed on the surface of the tube 12. The ring 56 is also in sealed engagement with the outer surface of the tube 12 rearwardly of the termini of the grooves 60.

The annular reinforcing member 50 has portions which fit into the grooves 60. An expansible chamber 61 is defined by the reinforcing member 50, the surface of the tube 12, the cylindrical member 54 and the ring 56.

A compressed gas source 62 is connected to an inertia sensitive valve 64 which, in turn, is connected by a conduit 66 to the expandable chamber 61.

An articulated steering shaft assembly 70 is supported in the steering column tubes 12 and 14. The shaft assembly 70 includes a forward shaft portion 72 which is of two-part telescopic construction. A rearward shaft section 74 is connected to the forward shaft section by means of a conventional universal joint 76. A steering wheel 78 is secured to the rearward end of the rearward steering shaft section 74.

OPERATION

The bracket 32 supports the steering column 10 in the position of FIG. 1 during normal operation. In the event the vehicle should strike an object, the inertia sensitive valve 60 will sense the extreme rate of deceleration and will permit compressed gas from the source 62 to pass through the conduit 60 to the chamber 61. Compressed gas in the chamber 61 will act upon the forward side of the ring 56, which functions as an annular piston, and will force it rearwardly in the cylindrical member 54 whereby the volume of the chamber 61 will increase.

The balls 58 carried by the ring 56 engage the ends of the grooves 60 and will force the tube 12 rearwardly when the ring 56 is forced rearwardly by the gas pressure. When the tube 12 is forced rearwardly by the compressed gas, the column 10 will be displaced to the position shown in FIG. 4. The bracket 32 will be plastically deformed. The bolt 38 engaging the notches 40 will force the forwardly extending arms 24 and 26 to be displaced upwardly whereby the tubes 12 and 14 will be in axial alignment. The inwardly extending detent members 31 and 33 of the forwardly extending arms 24 and 26 will be forced into locking engagement with the openings 80 and 82 formed in the overlapping portions of tube 12 and member 16. The bracket 32 will limit the rearward displacement of the tube 12.

Detents 84 are formed on the inner wall of the cylindrical member 54 whereby when the ring 56 is displaced rearwardly it will snap over the detent members 84.

When a forwardly moving object impacts the steering wheel 78 after the column assembly 10 has been displaced to the position shown in FIG. 4, energy will be absorbed by the forward displacement of the column, and more particularly by the forward displacement of the tube 12 relative to the ring 56 and balls 58. The detent members 84 will prevent the ring 56 from moving forwardly under an impact load whereby the balls 58 will plow surface grooves in the tube members 12. These grooves will form extensions of the grooves 60. The plastic deformation of the surface of the tube 12 will absorb the kinetic energy of the impact.

An energy absorbing steering column constructed in accordance with this invention has the advantage of providing a steering wheel that is situated at a convenient angle to the vehicle operator during normal operation and which is displaceable to an extended position whereby the distance which the column may travel under an impact load is greatly increased. The distance which the steering column may be displaced during its collapse under an impact load is increased by the amount that the annular piston ring 56 is displaced rearwardly when the column assembly is converted from its FIG. 1 organization to its FIG. 4 organization. The energy absorbing capacity of the column is increased in proportion to the increase in permissible travel under an impact load.

In an alternate embodiment of the invention, the compressed gas source 62 may be connected through inertia valve 64 with an air bag which forms a part of the passenger restraint system of the vehicle. In this embodiment, the gas source 62 and valve 64 perform the dual function of supplying gas under pressure to both the extendable steering column 10 and the passenger restraining air bag.

The foregoing description presents the presently preferred embodiment of this invention. Modifications and alterations may occur to those skilled in the art that will come within the scope and spirit of the following claims.

I claim:

1. An energy absorbing steering column for a motor vehicle having means constructed to normally support said column in a forward first position,
    inertia sensitive means constructed to displace said column rearwardly to a second position when subjected to a rate of deceleration that exceeds a predetermined minimum value,
    energy absorbing means constructed to resist the forward displacement of said steering column assembly from said second position toward said first position when said steering column is subjected to an impact load.

2. An energy absorbing steering column according to claim 1 and including:
    said inertia sensitive means including an expansible chamber device, a compressed gas source and, an inertia sensitive pressure release device connecting said source to said chamber,
    said inertia sensitive device being constructed to direct pressurized gas from said source to said expansible chamber device in response to a rate of deceleration that exceeds a predetermined minimum value,
    said expansible chamber device being constructed to displace said steering column to said second position in response to said pressurized gas.

3. An energy absorbing steering column according to claim 2 and including:
    said expansible chamber device including a piston means engaging said steering column,
    said piston means being constructed to displace said column rearwardly to said second position when exposed to gas pressure.

4. An energy absorbing steering column for a motor vehicle comprising:
a steering column tube,
a cylindrical member constructed to be secured to the fire wall of said vehicle,
said cylindrical member and said column tube defining a portion of an annular expansible chamber,
an annular piston fitted in said chamber and in sealed engagement with said column tube and said cylindrical member,
a plurality of deforming means supported by said annular piston and engaging said column tube,
a compressed gas source and means connecting said source to said expansible chamber,
said connecting means including an inertia sensitive pressure release means,
said pressure release means being constructed to provide communication of a pressurized gas from said source to said chamber,
said annular piston being constructed to displace said column tube rearwardly in response to pressurized gas in said chamber,
said deforming means being constructed to deform said column tube when said steering column is displaced forwardly under an impact load.

5. A steering column assembly for a motor vehicle comprising:
a forward column tube, a rearward column tube and means interconnecting said tubes,
said tubes being normally arranged at an obtuse angle,
support means supporting said tubes and constructed to be connected to vehicle body structure,
an articulated steering shaft assembly rotatably supported in said column tubes,
a steering wheel connected to the rearward end of said steering shaft assembly,
an annular expansible chamber device,
a fluid pressure source and means connecting said source to said expansible chamber device,
said connecting means including an inertia sensitive pressure release means,
said pressure release means being constructed to provide communication of a pressurized fluid from said source to said chamber device,
said chamber device being constructed to displace said forward column tube rearwardly in response to fluid pressure from said source,
said support means being constructed to position said rearward tube in axial alignment with said forward tube in response to the rearward displacement of said forward tube.

6. An energy absorbing steering column for a motor vehicle comprising:
a forward column tube, a rearward column tube and means interconnecting said tubes,
said tubes being normally arranged at an obtuse angle,
a bendable bracket supporting said tubes and constructed to be connected to vehicle body structure,
an articulated steering shaft assembly rotatably supported in said column tubes,
a steering wheel connected to the rearward end of said steering shaft assembly,
a cylindrical member constructed to be secured to the fire wall of said vehicle,
said cylindrical member and said forward tube defining a portion of an annular expansible chamber,
an annular piston fitted in said chamber and in sealed engagement with said forward tube and said cylindrical member,
a compressed gas source and means connecting said source to said expansible chamber,
said connecting means including an inertia sensitive pressure release means,
said pressure release means being constructed to provide communication of a pressurized gas from said source to said chamber,
said annular piston being constructed to displace said forward column tube rearwardly in response to pressurized gas in said chamber,
said bendable bracket being constructed to position said rearward tube in axial alignment with said forward tube in response to the rearward displacement of said forward tube.

7. An energy absorbing steering column according to claim 6 and including:
a forward portion of said steering shaft assembly being of telescopic construction,
a plurality of deforming means supported by said annular piston and engaging said forward tube,
said deforming means being constructed to deform said forward tube when said steering column is displaced forwardly under an impact load against said steering wheel.

* * * * *

UNITED STATES PATENT OFFICE
CERTIFICATE OF CORRECTION

Patent No. 3,811,337    Dated May 21, 1974

Inventor(s) William D. Allison

It is certified that error appears in the above-identified patent and that said Letters Patent are hereby corrected as shown below:

Column 2, line 29, delete "The";

delete lines 30, 31 and 32.

Column 3, line 33, change "valve 60" to -- valve 64 --;

line 35, change "conduit 60" to -- conduit 66 --.

Signed and Sealed this

*twentieth* Day of *April 1976*

[SEAL]

Attest:

RUTH C. MASON
*Attesting Officer*

C. MARSHALL DANN
*Commissioner of Patents and Trademarks*